L. H. Farnsworth,
Tool Handle.
N° 64,006.                               Patented Apr. 23, 1867.
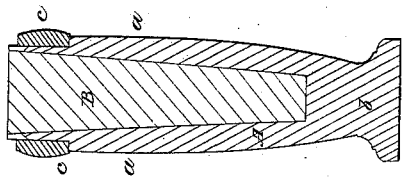
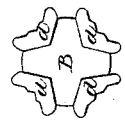
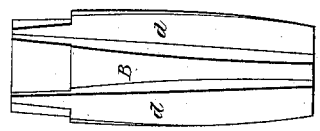
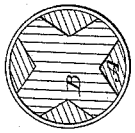
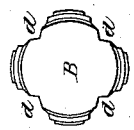
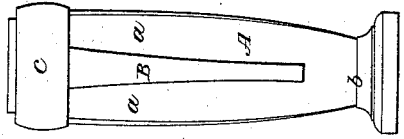
Witnesses:
Samuel N. Piper
Geo. H. Andrews.
Inventor:
Luther H. Farnsworth
by his attorney
R. H. Eddy

United States Patent Office

LUTHER H. FARNSWORTH, OF HUDSON, MASSACHUSETTS.

Letters Patent No. 64,006, dated April 23, 1867.

---

IMPROVEMENT IN TOOL HANDLES.

---

The Schedule referred to in these Letters Patent and making part of the same.

---

TO ALL PERSONS TO WHOM THESE PRESENTS SHALL COME:

Be it known that I, LUTHER H. FARNSWORTH, of Hudson, in the county of Middlesex, and State of Massachusetts, have invented a new and useful Improvement in Tool Handles; and do hereby declare the same to be fully described in the following specification, and represented in the accompanying drawings, of which—

Figure 1 is a side view.

Figure 2, a longitudinal section; and

Figure 3 a transverse section of a tool handle made in accordance with my invention.

Figure 4 is a top view of the furcated and shouldered stock.

Figure 5 is a side view.

Figure 6, a top view; and

Figure 7 a bottom or lower end view of the wooden heart piece placed within the furcated stock.

The handle consists of three principal parts, viz, the metallic shouldered and furcated stock A, the wooden heart piece B, and the collar or ferrule C. The furcated stock has a series of prongs, $a$, extended from a head, $b$, each of such prongs being provided with a shoulder, $c$, on its upper part, the whole being arranged as represented. The collar fits on and encompasses the several prongs at their upper ends, and rests on and against their shoulders $c$. The wooden heart piece B is formed to fill the space within the stock A, its sides being grooved, as shown at $d\ d$, to receive the prongs. The outer surfaces of the parts of the heart piece, which go between the prongs, are curved in correspondence with the outer surfaces of the prongs. The heart piece is to receive and hold the shank of a chisel or other tool to be fixed to the handle. The prongs, by extending from the head up to within and against the collar, prevent the heart piece from being split or injured by blows of a hammer or mallet on the head.

I claim the combination and arrangement of the metallic shouldered prongs and the head constituting the stock A, with the metallic collar C and the heart piece B, the whole being make substantially as specified.

I also claim the stock A, made with the head, the series of prongs, and the shoulders thereof, as described.

LUTHER H. FARNSWORTH.

Witnesses:
R. H. EDDY,
SAMUEL N. PIPER.